(12) United States Patent
Yang

(10) Patent No.: US 9,810,547 B2
(45) Date of Patent: Nov. 7, 2017

(54) APPARATUS AND METHOD FOR SHOWING MAP INFORMATION IN VEHICLE

(71) Applicant: HYUNDAI MOTOR COMPANY, Seoul (KR)

(72) Inventor: Won Seok Yang, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/168,974

(22) Filed: May 31, 2016

(65) Prior Publication Data

US 2017/0102246 A1 Apr. 13, 2017

(30) Foreign Application Priority Data

Oct. 12, 2015 (KR) ........................ 10-2015-0142221

(51) Int. Cl.
*G01C 21/36* (2006.01)
*G01C 21/00* (2006.01)

(52) U.S. Cl.
CPC ....... *G01C 21/3673* (2013.01); *G01C 21/367* (2013.01)

(58) Field of Classification Search
None
See application file for complete search history.

(56) References Cited

U.S. PATENT DOCUMENTS

| | | | | |
|---|---|---|---|---|
| 5,848,374 A * | 12/1998 | Wakabayashi | ......... | G01C 15/00 340/990 |
| 6,178,380 B1 * | 1/2001 | Millington | ........... | G01C 21/367 340/990 |
| 2005/0143914 A1 | 6/2005 | Yamada et al. | | |
| 2006/0173614 A1 * | 8/2006 | Nomura | ................ | G01C 21/32 701/425 |
| 2007/0229538 A1 * | 10/2007 | Klassen | ............... | G01C 21/367 345/629 |
| 2008/0306684 A1 * | 12/2008 | Yamazaki | .......... | G01C 21/3673 701/532 |
| 2009/0024319 A1 * | 1/2009 | Tsuji | .................. | G01C 21/3673 701/533 |
| 2015/0185991 A1 * | 7/2015 | Ho | ......................... | G06F 3/0484 715/771 |
| 2016/0071298 A1 * | 3/2016 | Liu | ........................... | G06T 3/40 345/635 |
| 2016/0356618 A1 * | 12/2016 | Wang | .................... | G01C 21/367 |

FOREIGN PATENT DOCUMENTS

| | | |
|---|---|---|
| JP | 8-21738 | 1/1996 |
| JP | 9-101747 | 4/1997 |
| JP | H09-101747 A | 4/1997 |
| JP | 2928404 | 8/1999 |
| JP | 2001-153667 A | 6/2001 |

(Continued)

*Primary Examiner* — Krishnan Ramesh
(74) *Attorney, Agent, or Firm* — Brinks Gilson & Lione

(57) ABSTRACT

A method and an apparatus can provide map information to a user or a driver. In the method, a range that is, based upon a current specific location on the map, currently representable on the screen, is determined. A road included in the range that is currently representable on the screen can be shown with a road name. In response to each change of at least one of the specific location or the range, the range is determined and the road with the corresponding road name can be provided.

20 Claims, 13 Drawing Sheets

(56) References Cited

FOREIGN PATENT DOCUMENTS

| JP | 2003-050132 | 2/2003 |
| JP | 2003-75186 | 3/2003 |
| JP | 2009-14692 | 1/2009 |
| KR | 10-0454948 | 11/2004 |
| KR | 10-0634002 | 10/2006 |
| KR | 10-2009-0107311 A | 10/2009 |
| KR | 10-2010-0005048 | 1/2010 |

* cited by examiner

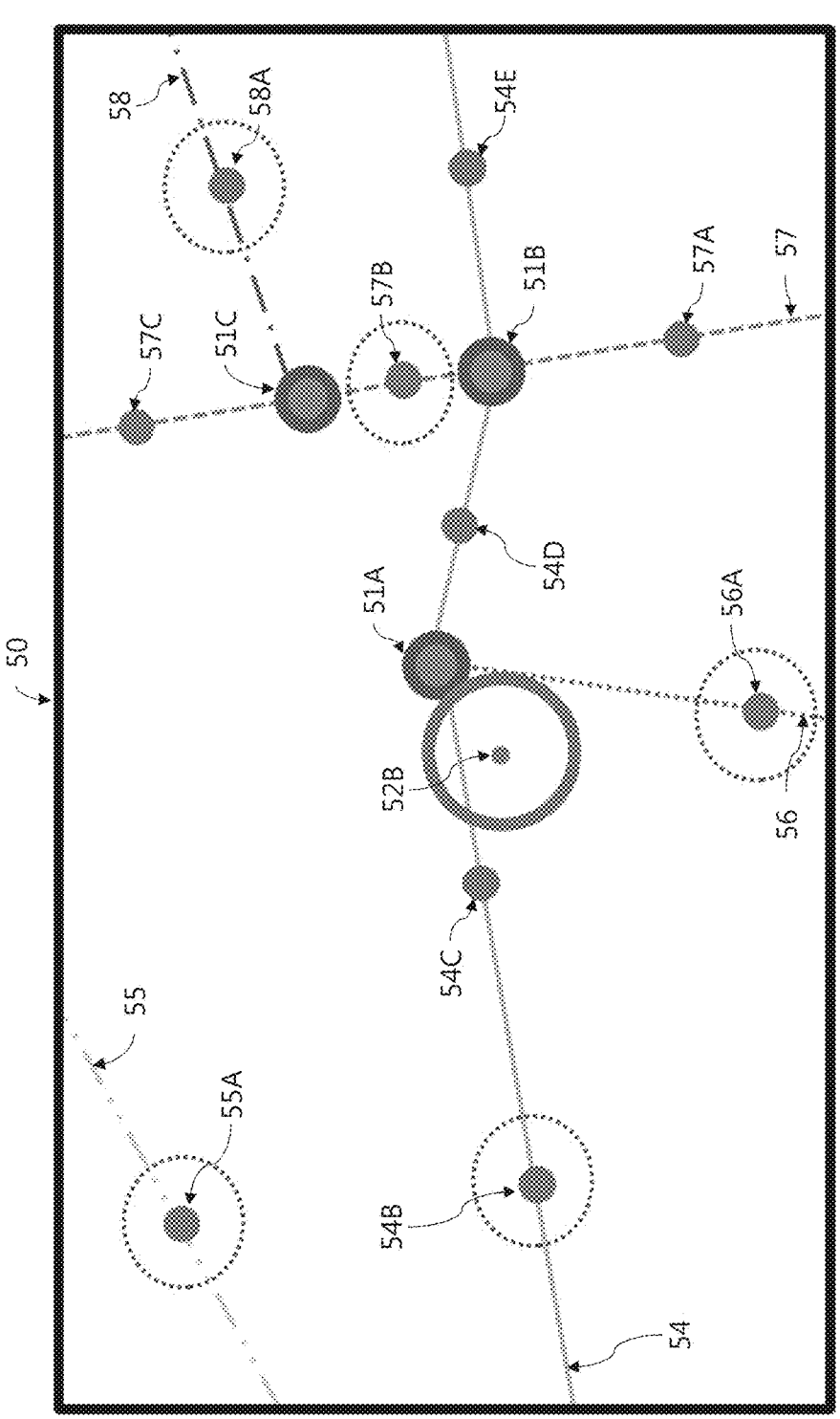

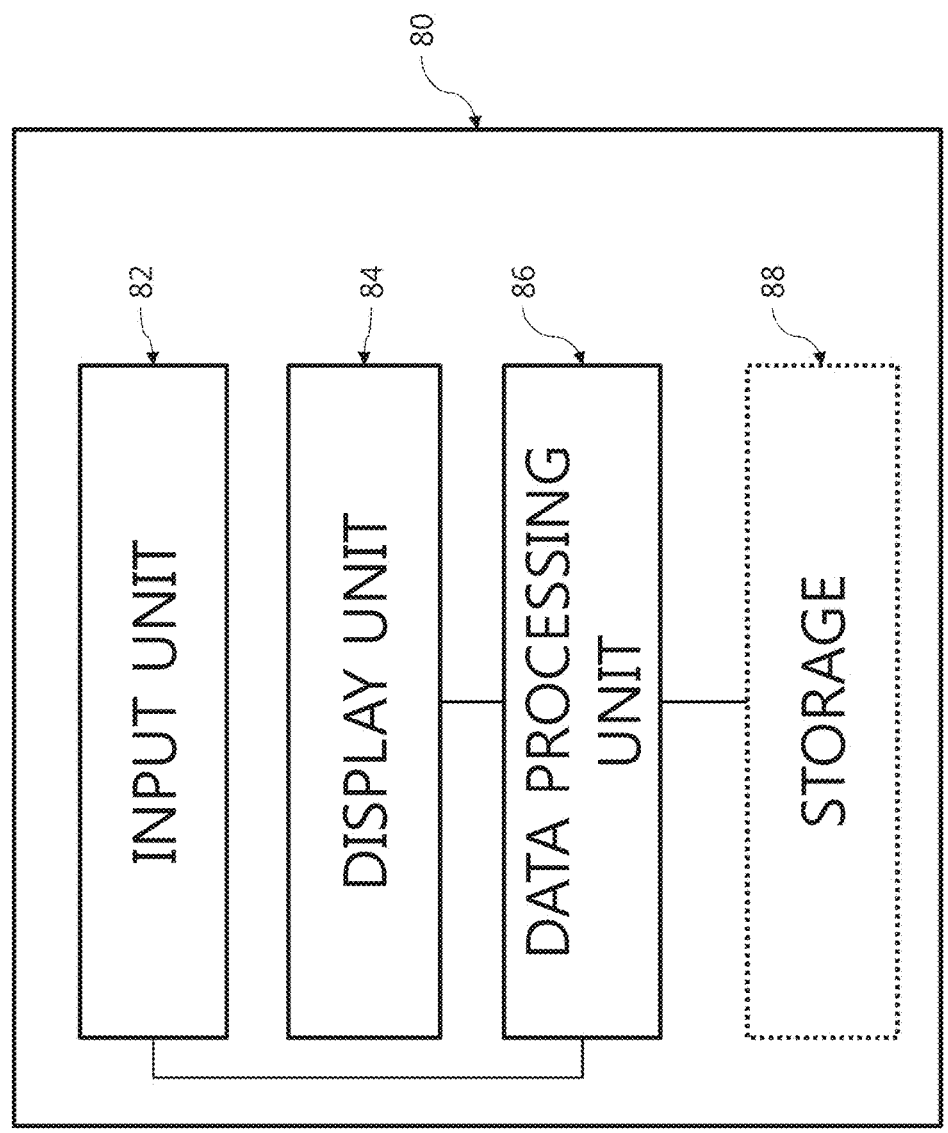

APPARATUS AND METHOD FOR SHOWING MAP INFORMATION IN VEHICLE

CROSS-REFERENCE TO RELATED APPLICATION

This application claims priority to Korean Patent Application No. 10-2015-0142221, filed on Oct. 12, 2015 in the Korean Intellectual Property Office, the entire contents of which is hereby incorporated by reference as if fully set forth herein.

FIELD

The disclosure relates to an apparatus and a method for showing map information in a vehicle, and more particularly, to an apparatus and a method for dynamically showing information provided from a navigation device, or a global positioning system (GPS), included in the vehicle.

BACKGROUND

A vehicle can include, or engage with, a navigation device (sometimes, referred as to a global positioning system (GPS) or a GPS navigation) which searches a route (or path) from a point of departure to destination inputted by a user (or driver), and provides guidance for driving on the route (or path). The navigation device generally uses the global positioning system (GPS) for receiving via an antenna GPS signals transmitted from a plurality of GPS satellites and analyzing locations of GPS satellites, time information, etc. included in the GPS signals, to recognize a current position. To recognize the current position, at least four GPS satellites may be used. For example, a GPS based on a single GPS satellite may have a 10-meter error range (or a degree of precision or accuracy) while a differential GPS (DGPS) using a plurality of GPS satellites may have an error range of less than 5 meters.

FIGS. 1A and 1B show examples of a conventional GPS navigation device for showing information about street/road names.

In FIG. 1A, on a screen of GPS navigation device, a road name, e.g., Hyoryeong-ro 68-gil, is shown at a specific location 14 adjacent to a central location 12A of the screen. The specific location 14 is fixed on a map provided by the GPS navigation device.

In FIG. 1B, according to a user's (or driver's) request, the screen of the GPS navigation device changes to show surrounding information while a vehicle (or a current position recognized by a GPS) moves from previous central location 12A to current central location 12B. Since the specific location 14 showing the road name 'Hyoryeong-ro 68-gil' is not included within a particular range based on the current position 12B, the road name 'Hyoryeong-ro 68-gil' disappears from the screen.

The user (or driver) can be more concerned than ever before with recognition of road names provided by a GPS navigation device. For example, South Korea began the Road Name Address system on Jan. 1, 2014. While a whole map included in the GPS navigation device includes road names matched with every road or street, the GPS navigation device is limited to showing representable information on its screen, so that a road name may not always be shown while a vehicle moves along the same road or street. Accordingly, if the screen changes in response to vehicle's (or user's) movement, the screen may not show a road name which was shown on a previous screen. In this case, a driver (or a passenger) should memorize the road name (or recognize surrounding information provided by the GPS navigation device) so as to understand a current position while operating a vehicle.

SUMMARY

An apparatus and a method for use in a navigation device engaging with a vehicle can provide an apparatus and a method for showing surrounding information (or a road name) at a variable position on a map provided by the navigation device.

Further, a navigation device may, instead of including a road name at a specific fixed position on a map, store a road name as a link matched with the map, so that the road name is shown at either an interpolation point which can be located on the link or at a virtual interpolation point which can be determined in response to user's choice (or user's request) or a current position. Accordingly, the navigation device can show the road name regardless of a location or a representable range, based on user's choice, user's request, or the current position.

A method for providing map information can include determining a range that is, based upon a current specific location on the map, currently representable on the screen, and showing a road included in the range that is currently representable on the screen, with a road name. The steps of determining the range and showing the road can be performed in response to each change of at least one of (i) a specific location on a map or (ii) a range that is, based upon a specific location on the map, representable on the screen.

A respective location for each road name on the map can be changeable in response to which range is currently representable on the screen.

The method can further include determining whether a scale of the range that is currently representable on the screen is equal to or smaller than a predetermined scale of map at which a road name will be shown.

The map can include a plurality of nodes, each representing a junction; at least one link connecting at least two of the plurality of nodes, the at least one link corresponding to the road name; and at least one interpolation point located on the link.

For showing the road with the road name, the method can include assigning a location on the map at a center of the screen as the specific location to determine latitudes and longitudes defining a region corresponding to a size of the screen; searching for an interpolation point included in the region defined by the latitudes and the longitudes to determine coordinates of the screen that correspond to a selected interpolation point; and showing the road name at a location corresponding to the coordinates of the screen that correspond to a selected interpolation point.

For searching for the interpolation point, the method can include reserving, as a reserved interpolation point, an interpolation point that is located within a predetermined range from the center of the screen; assigning, as a candidate point, an interpolation point that is adjacent to the center of the screen and that is not reserved as a reserved interpolation point; determining whether the candidate point is included in the region defined by the latitudes and the longitudes; and when the candidate point is included in the region defined by the latitudes and the longitudes, selecting the candidate point as a selected interpolation point.

When the candidate point is not included in the region defined by the latitudes and the longitudes, searching for an interpolation point the step of searching the interpolation point can include at least one of: determining a first middle point between the candidate point and a node included in the map; or determining a second middle point between the reserved interpolation point and a virtual point. The virtual point can be an intersection of a link passing through the reserved interpolation point and a boundary of the region defined by the latitudes and the longitudes.

For searching for the interpolation point, the method can further include selecting at least one of the first middle point or the second middle point to be a selected interpolation point.

For showing the road with the road name, the method can further include when a plurality of selected interpolation points are selected, choosing one of the plurality of selected interpolation points that is closest to the center of the screen.

An apparatus for providing map information on a GPS navigation device can include a processing system that comprises at least one data processor and at least one computer-readable memory storing a computer program. The processing system can be configured to cause the apparatus to determine a range that is, based upon a current specific location on the map, currently representable on the screen, and show a road included in the range that is currently representable on the screen, with a road name. The processing system can be configured to perform the steps of determining the range and showing the road with the road name in response to each change of at least one of (i) a specific location on a map or (ii) a range that is, based upon a specific location on the map, representable on the screen.

The processing system can be further configured to determine whether a scale of the range that is currently representable on the screen is equal to or smaller than a predetermined scale of map at which a road name will be shown.

An apparatus for providing map information can include a data processing unit configured to receive a map and process information included in the map; an input unit configured to deliver received input to the data processing unit; and a display unit configured to show processed information output from the data processing unit. The data processing unit can be configured to cause the apparatus to determine a range that is, based upon a current specific location on the map, currently representable on the screen, and show a road included in the range that is currently representable on the screen, with a road name. The data processing unit can be configured to perform the steps of determining the range and showing the road with the road name in response to each change of at least one of (i) a specific location on a map or (ii) a range that is, based upon a specific location on the map, representable on the screen A respective location for each road name on the map can be changeable in response to which range is currently representable on the screen.

The data processing unit can be further configured to determine whether a scale of the range that is currently representable on the screen is equal to or smaller than a predetermined scale of map at which a road name will be shown.

The map can include a plurality of nodes, each representing a junction; at least one link connecting at least two of the plurality of nodes, the at least one link corresponding to the road name; and at least one interpolation point located on the link.

In order to show the road with the road name, the data processing unit can be further configured to assign a location on the map at a center of the screen as the specific location to determine latitudes and longitudes defining a region corresponding to a size of the screen; search for an interpolation point included in the region defined by the latitudes and the longitudes to determine coordinates of the screen that correspond to a selected interpolation point; and show the road name at a location corresponding to the coordinates of the screen that correspond to a selected interpolation point.

In order to search for the interpolation point, the data processing unit can be further configured to reserve, as a reserved interpolation point, an interpolation point that is located within a predetermined range from the center of the screen; assign, as a candidate point, an interpolation point that is adjacent to the center of the screen and that is not reserved as a reserved interpolation point; determine whether the candidate point is included in the region defined by the latitudes and the longitudes; and when the candidate point is included in the region defined by the latitudes and the longitudes, select the candidate point as a selected interpolation point.

The data processing unit can be further configured to, when the candidate point is not included in the region defined by the latitudes and the longitudes, at least one of: determine a first middle point between the candidate point and a node included in the map; or determine a second middle point between the reserved interpolation point and a virtual point. The virtual point can be an intersection of (i) a link passing through the reserved interpolation point and (ii) a boundary of the region defined by the latitudes and the longitudes.

The data processing unit can be further configured to select at least one of the first middle point or the second middle point to be a selected interpolation point.

The data processing unit can be further configured to, when a plurality of selected interpolation points are selected, choose one of the plurality of selected interpolation points that is closest to the center of the screen.

DRAWINGS

The accompanying drawings, which are included to provide a further understanding of the disclosure and are incorporated in and constitute a part of this application, illustrate form(s) of the disclosure and together with the description serve to explain principles of the disclosure. In the drawings:

FIGS. 1A and 1B show examples of a conventional GPS navigation device for showing information about street/road names;

FIGS. 2A and 2B describe operation results of a GPS navigation device;

Figure 1A:
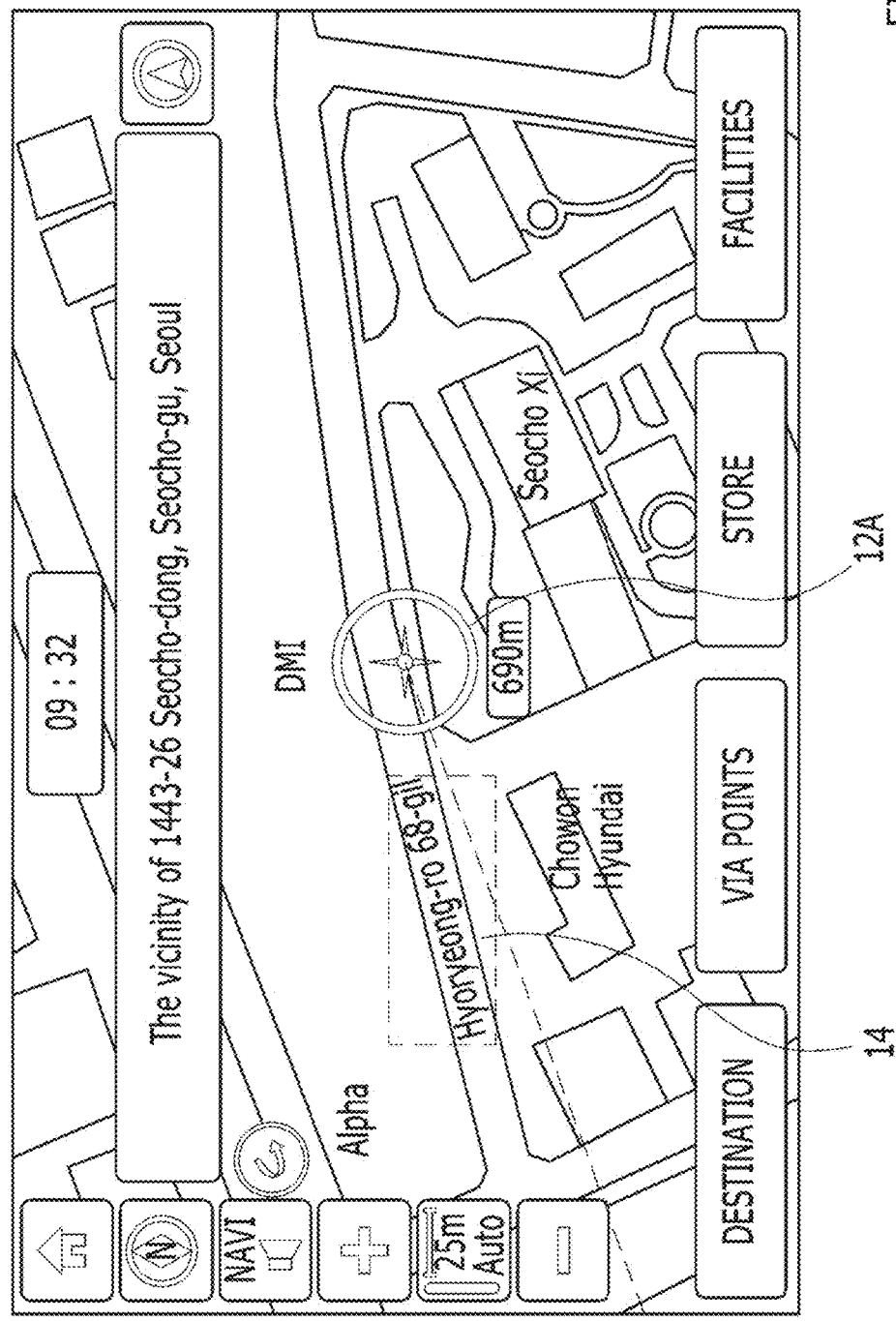
Figure 1B:
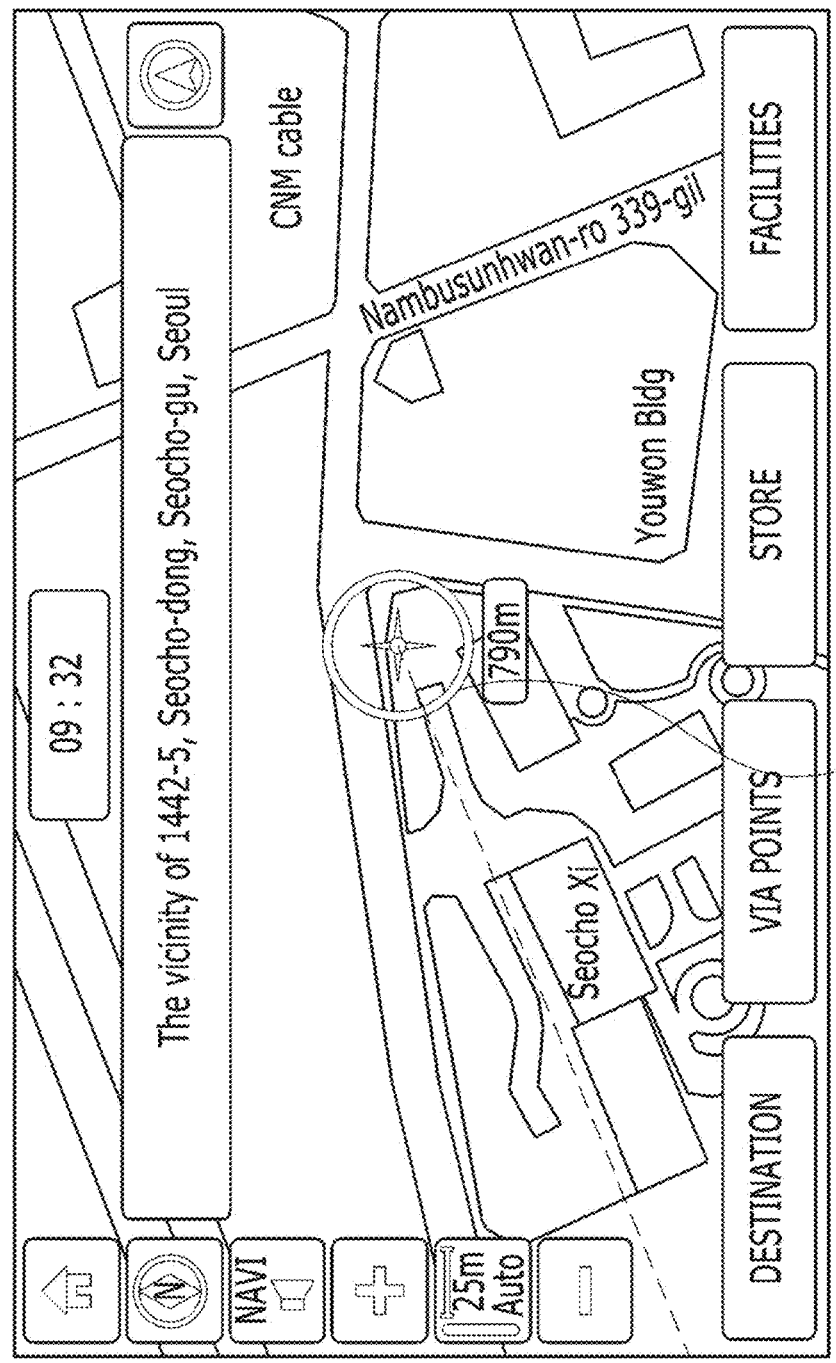

FIGS. 5A, 5B, 5C, 5D, 5E, and 5F describe operations of a GPS navigation device; and FIG. 6 shows a GPS navigation device.

DETAILED DESCRIPTION

Reference will now be made in detail to preferred forms of the disclosure, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having," as used herein, are defined as comprising (i.e. they are open transitional phrases). The terms "coupled" or "operatively coupled," as used herein, are defined as connected, although not necessarily directly, and not necessarily mechanically.

In the description of the disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

Figure 2A:
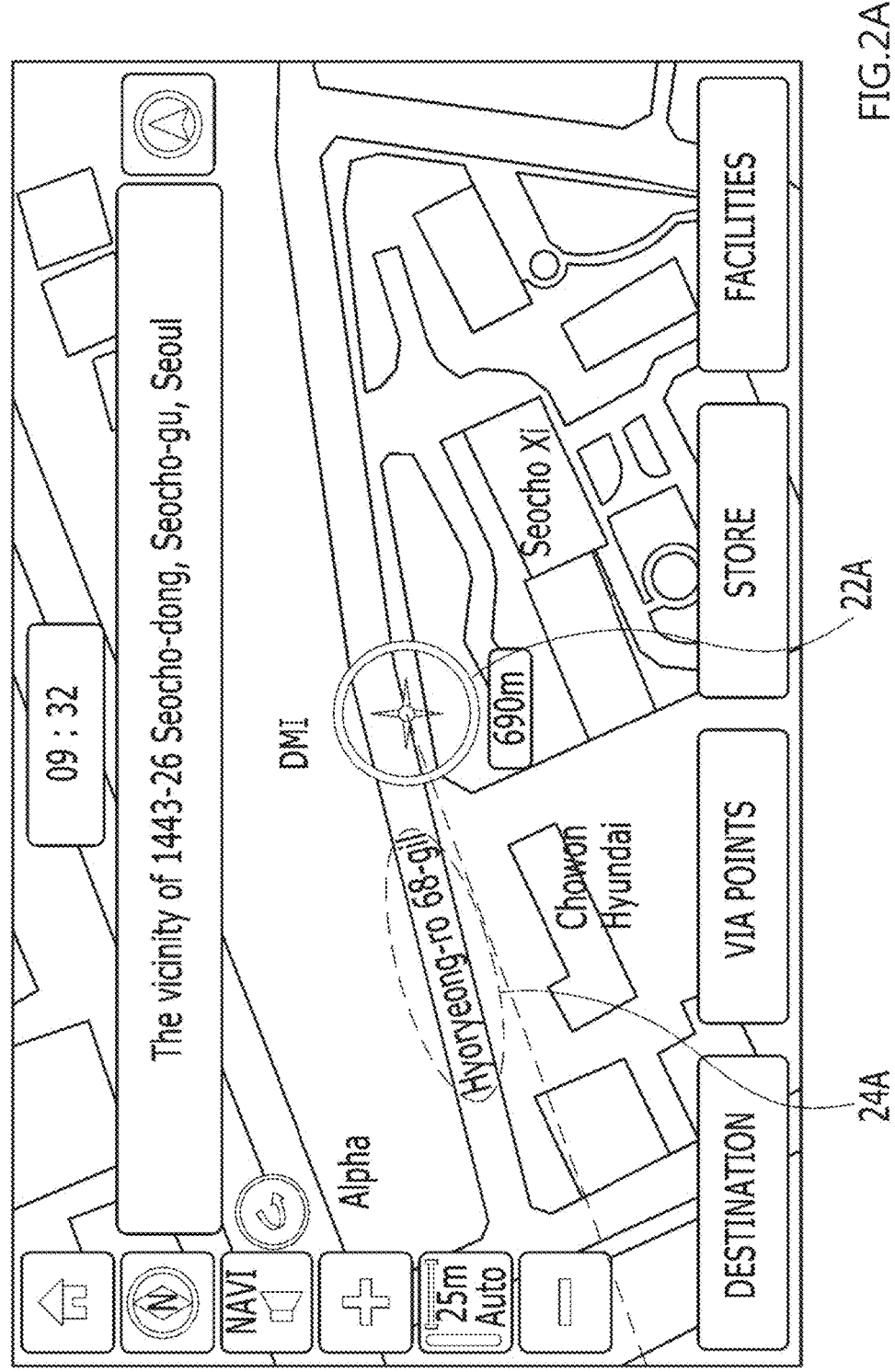
Figure 2B:
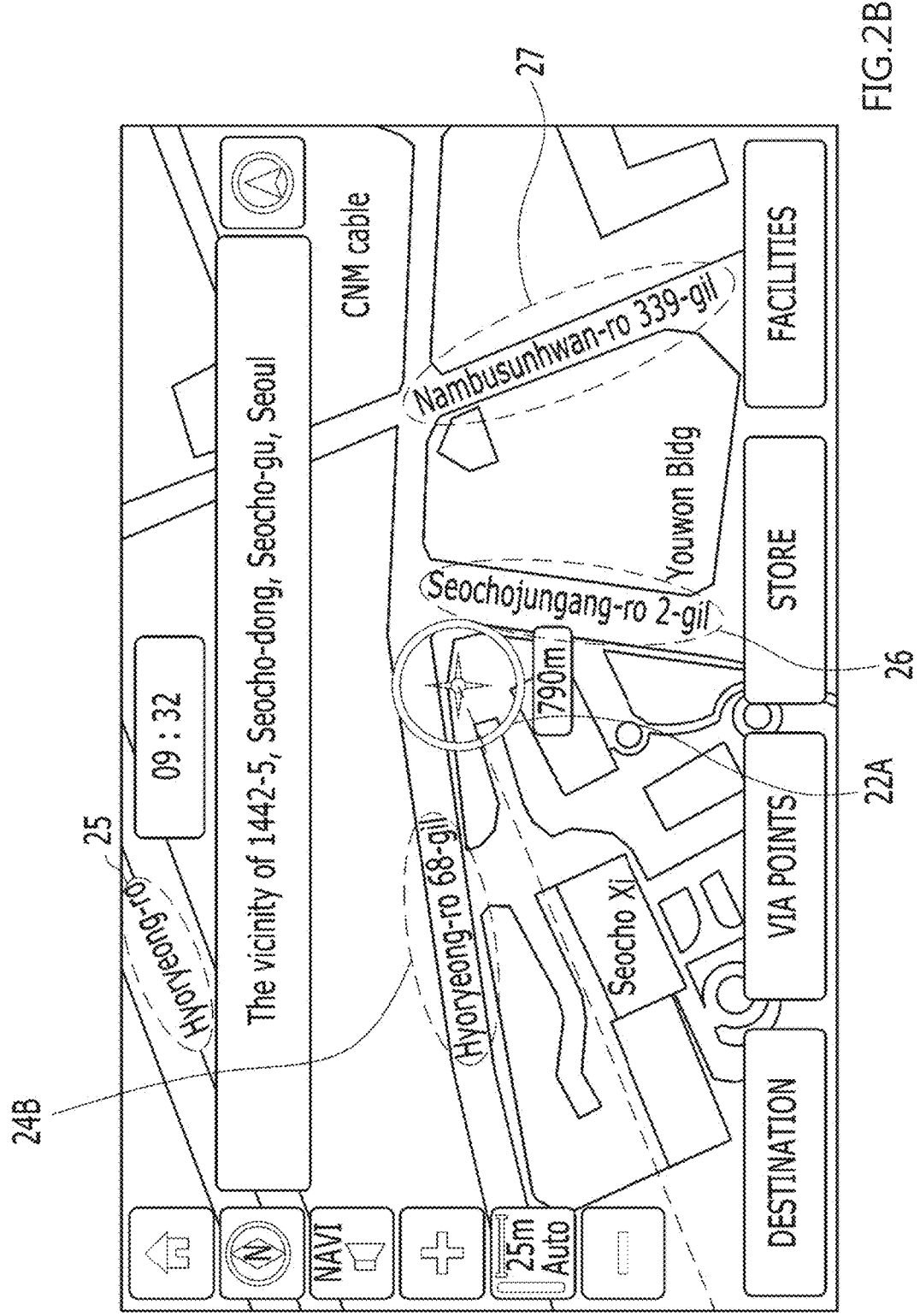

FIGS. 2A and 2B describe operation results of a GPS navigation device.

In FIG. 2A, a screen of a GPS navigation device can show a road name, e.g., Hyoryeong-ro 68-gil, at a specific location 24A adjacent to a central location 22A of the screen. Central location 22A and kinds of map information that are shown via the screen can be determined by user's request. Specific location 24A at which the road name is located is adjacent to the central location 22A.

In FIG. 2B, in the GPS navigation device, as the central location of the screen changes (from 22A to 22B) according to a user's (or driver's) request, map information regarding an area surrounding the central location is shown. Although the specific location 24A that showed the road name in FIG. 2A is not included within a predetermined range of the central location 22B set according to user's request, the same road name, i.e., Hyoryeong-ro 68-gil, is now shown at a new specific location 24B in FIG. 2B. In the screen, several road names are shown at different locations 24B, 25, 26, 27 within the area surrounding the central location 22B.

In FIGS. 2A and 2B, when showing road information on a map at user's request, the GPS navigation device can determine a respective location of each road name, which is changeable in response to a specific region given or selected by a user. As a non-limiting example, while the screen changes based on user's request (or while a vehicle operates), the road name of 'Hyoryeong-ro 68-gil' changes from being marked at the previous position 24A to being marked at the current position 24B.

To show roads with their names on every screen, a GPS navigation device could always show the road names, even if the screen changes, when the road names on a map are fixed at close intervals in a region which a user or a driver can select. However, in that case, volume or size of map information including road names repeatedly stored at every narrow interval can increase dramatically. If the volume or size of map information increases, economic feasibility and efficiency of the GPS navigation device can deteriorate. To overcome above described issues, the road name shown via a screen of the GPS navigation device can, instead of being stored at a fixed position on a map, be located at a position that is changeable in response to a specific region or space requested by a user.

Figure 3:
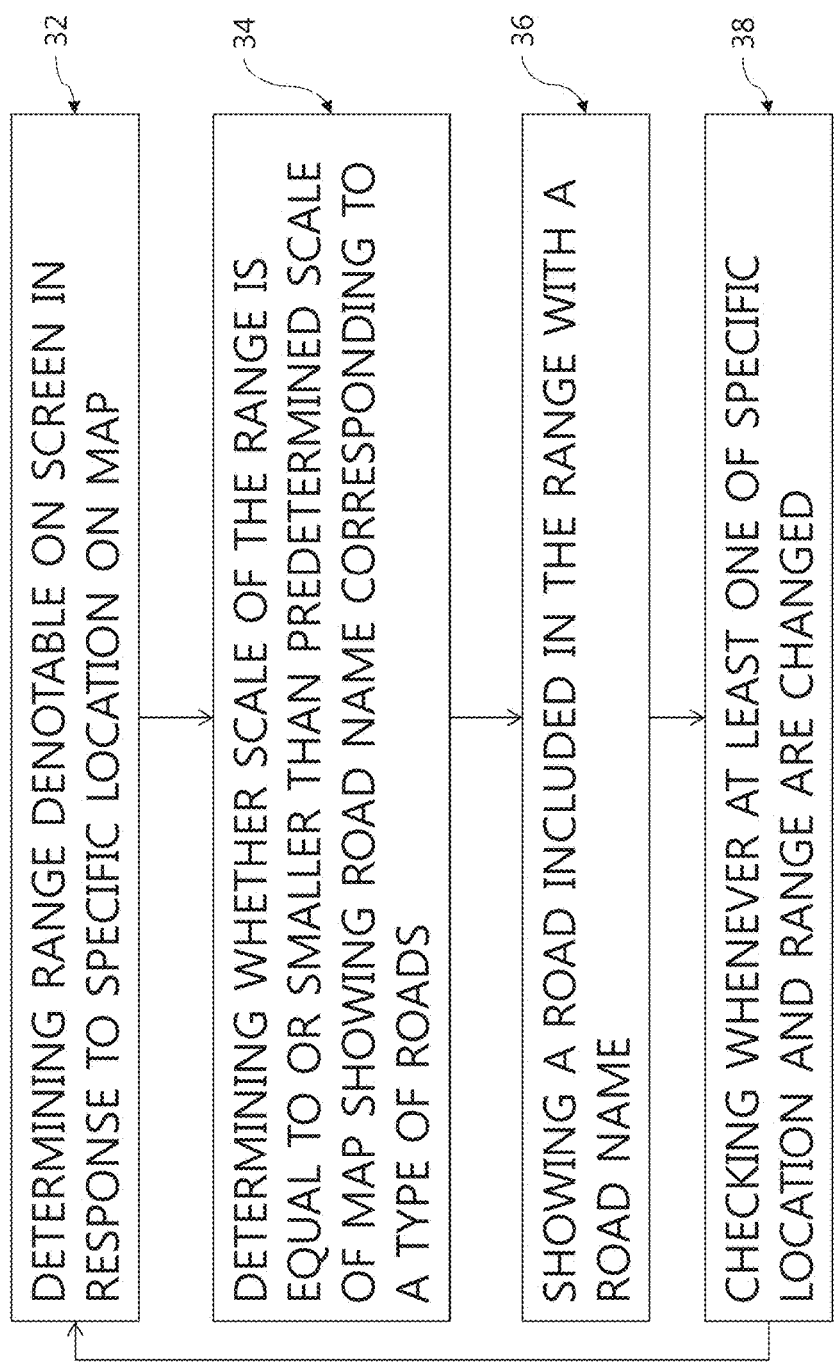
FIG. 3 shows a method for dynamically showing road information in a navigation device.

FIG. 3 shows a method for dynamically showing road information in a GPS navigation device.

As shown, a method for providing map information can include determining a range that is, based upon a current specific location on the map, currently representable on the screen (step 32), and showing a road included in the range that is currently representable on the screen, with a road name (step 36). Further, the method can include checking whether the specific location or the range is changed (step 38). The steps of determining the range and showing the roads (steps 32, 36) can be performed whenever at least one of the specific location or the range are changed.

Further, the method can include determining whether a scale of the range is equal to or smaller than a predetermined scale of map at which road names can be shown (step 34). For example, the method can include determining whether a scale of the range is equal to or smaller than a predetermined scale of map showing the road name corresponding to a type of roads. As a non-limiting example, road names can be shown on a map having a scale of about 1:2500 to 1:5000 (e.g., 1 cm:25 m to 50 m, where 1 cm is a distance on a screen while 25 m to 50 m is an actual distance). If the map has a scale of 1:10000 (i.e., a 1 cm distance on the screen can be matched with a 100 m true distance), road names included in the map may not be shown. The map scale for showing road names can be adjusted.

In above described methods, a respective location for each road name on a map can be changeable in response to the range. For changing the location of road names, the map can include a plurality of nodes, each representing a crossing, at least one link connecting at least two of the plurality of nodes, and at least one interpolation point located on the link. The link can stand for a road having its name. The road name can be selectively marked at one of a plurality of interpolation points on the corresponding link.

Figure 4:
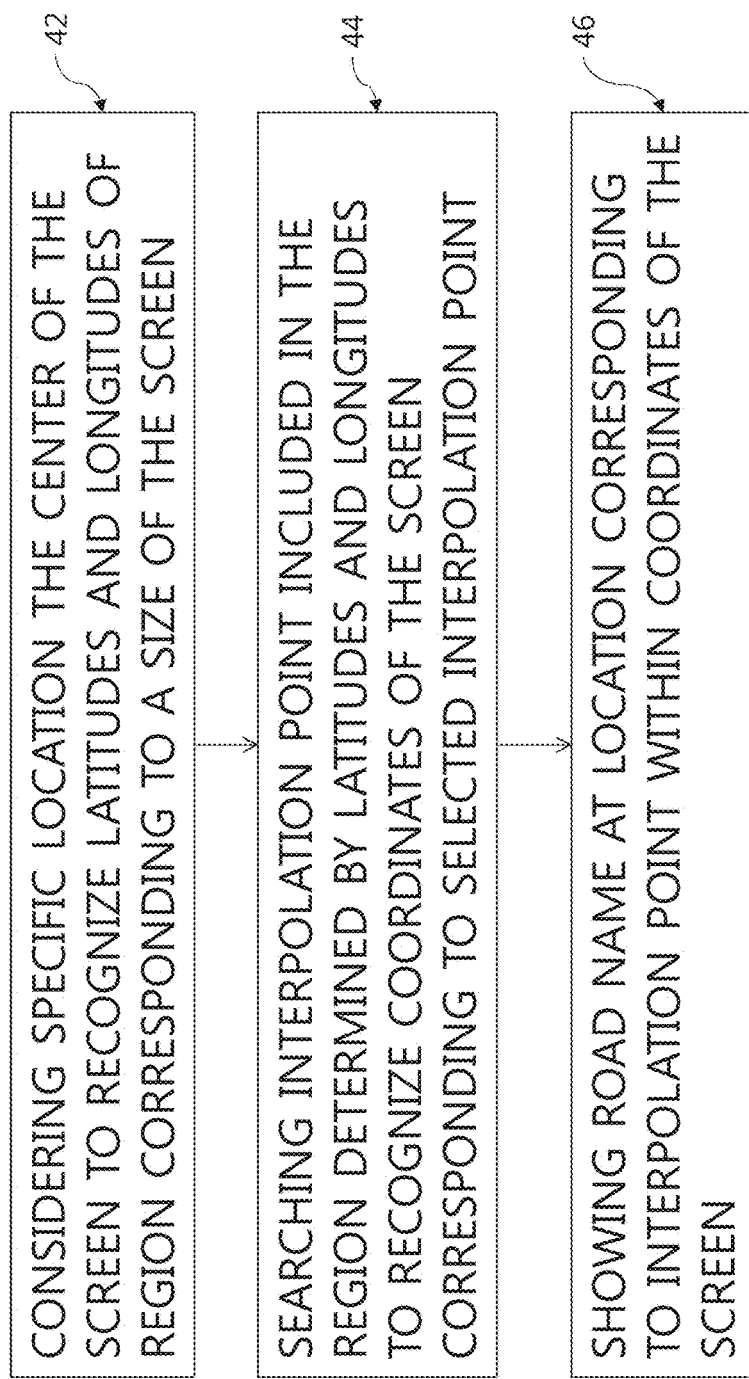
FIG. 4 shows a method for showing roads with roads' names included in a representable range on a screen.

FIG. 4 shows a method for showing roads with roads' names included in a representable range on a screen.

As shown, for showing the roads with their names, a location on the map at a center of the screen can be assigned as the specific location to determine latitudes and longitudes defining a region corresponding to a size of the screen (step 42). As a non-limiting example, the specific location can be the current location while a vehicle drives. While the vehicle does not move, the specific location can be given or inputted by a user or a driver. The method can further include searching for an interpolation point included in the region defined by the latitudes and the longitudes to determine coordinates of the screen that correspond to a selected interpolation point (step 44), and showing the road name that is linked with the selected interpolation point at a location determined by the coordinates of the screen corresponding to the selected interpolation point (step 46).

In order to search for the interpolation point, the method can include reserving some interpolation points which are within a predetermined range from the center of the screen. An interpolation point which is too close to the center of the screen may be not appropriate for marking a road name because readability on a screen of a GPS navigation device may get worse. After reserving some interpolation points, another interpolation point, which is adjacent to the center of the screen but is not a reserved interpolation point, can be considered a candidate point for marking the road name. The method can determine whether the candidate point is in the representable range of the screen of GPS navigation (i.e., check whether the candidate point is in the region defined by the latitudes and the longitudes). Although the GPS navigation device marks a road name at the candidate point, the road name cannot be shown on the screen if the candidate point is not included in the region, i.e., the currently representable range on the screen. Accordingly, a candidate point that is included in the region can be recognized as the selected interpolation point for marking the road name.

If the candidate point is not included in the region, the step of searching for the interpolation point (step 44) can include determining a first middle point between a node included in the map and the candidate point. The node can be an end of a link on which the candidate point is located. Since the candidate point is out of the region, the GPS navigation device needs to find another point within the region at which to mark the road name. Further, the step of searching for the interpolation point (step 44) can include determining a second middle point between the reserved interpolation point and a virtual point, wherein the virtual point is an intersection of a link passing through the reserved interpolation point and a boundary of the region.

The first middle point and the second middle point are not true interpolation points, but can be considered a temporary point for marking a road name based on the region shown on the screen of the GPS navigation device. Accordingly, the step of searching for the interpolation point (step 44) can further include considering at least one of the first middle point and the second middle point to be the selected interpolation point.

If there is a plurality of of selected interpolation points, the method can choose one of the plurality of selected interpolation points that is the closest to the center of the screen, so as to show or mark the road name.

FIGS. 5A to 5F describe operations of a GPS navigation device.

Figure 5A:
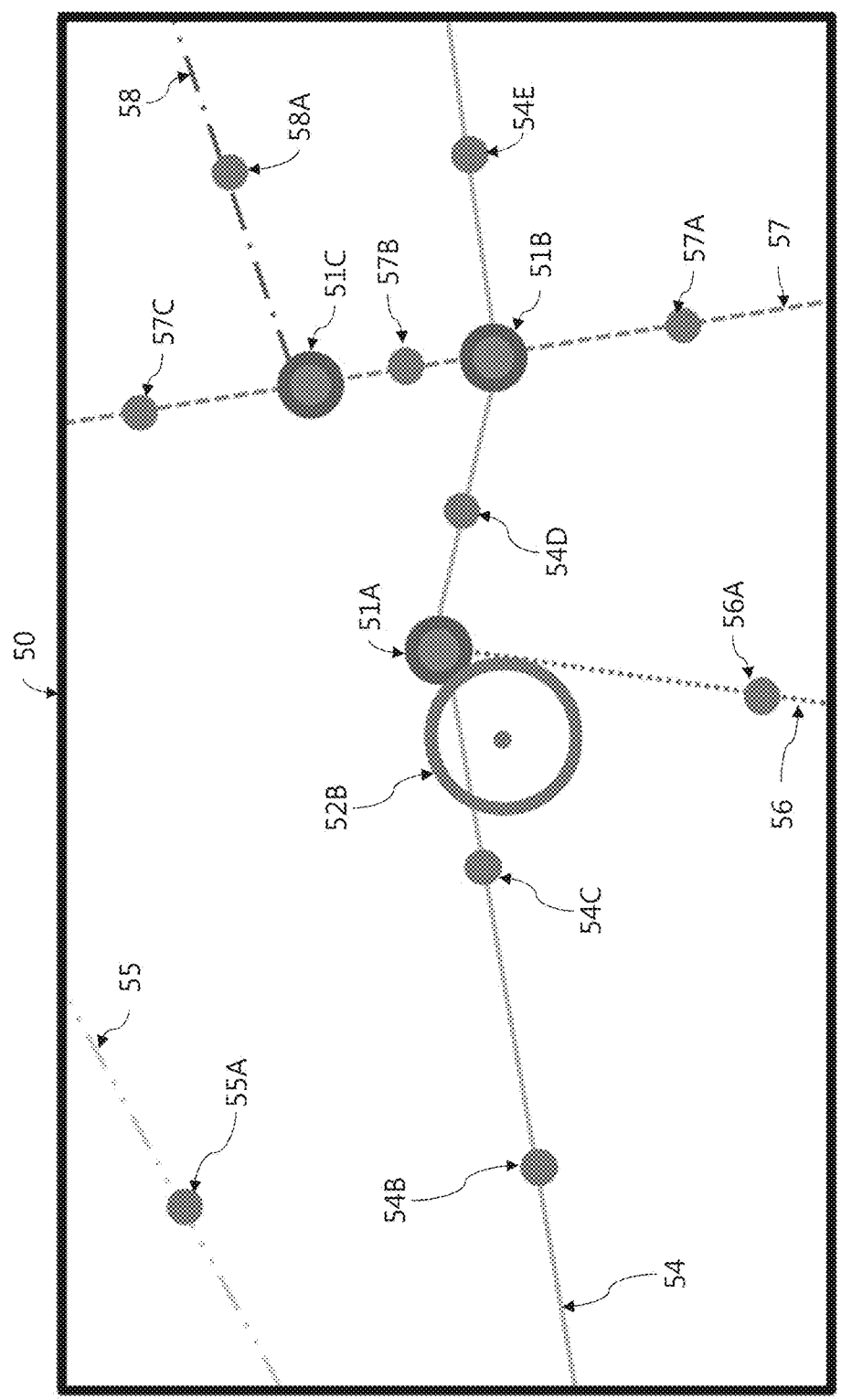

In FIG. 5A, to provide map information, the GPS navigation device can configure a representable region 50 which is shown on a screen. The representable region 50 can be determined based on a central location 52B and a scale of provided map, which are given or inputted by a user, a driver or a passenger. For the way of example but not limitation, if assuming that plural information shown in FIG. 5a can be shown on the screen, the plural information on the screen can be matched with the map information shown in FIG. 2b.

The representable region 50 can be determined based on a size of the screen (e.g., width and height lengths of screen determined by right, left, top and bottom sides). Calculation of latitudes and longitudes for determining the right, left, top and bottom sides from the coordinates of the central location 52B may be used for defining the representable region 50. The latitudes and longitudes for the representable region 50 can be adjusted according to a scale of map which is given or selected by a user.

Map information included in the representable region 50 can include a plurality of nodes 51A, 51B, 51C, a plurality of links 54, 55, 56, 57, 58 connecting the plurality of nodes 51A, 51B, 51C to each other, and at least one interpolation point 54B, 54C, 54D, 54E, 55A, 56A, 57A, 57B, 57C, 58A. Each node 51A, 51B, 51C can stand for a respective crossing, intersection or junction (i.e., an actual place where at least two roads cross). Each link 54, 55, 56, 57, 58 can stand for a respective road. The map information can include respective road names, each corresponding to one of links 54, 55, 56, 57, 58.

Figure 5B:
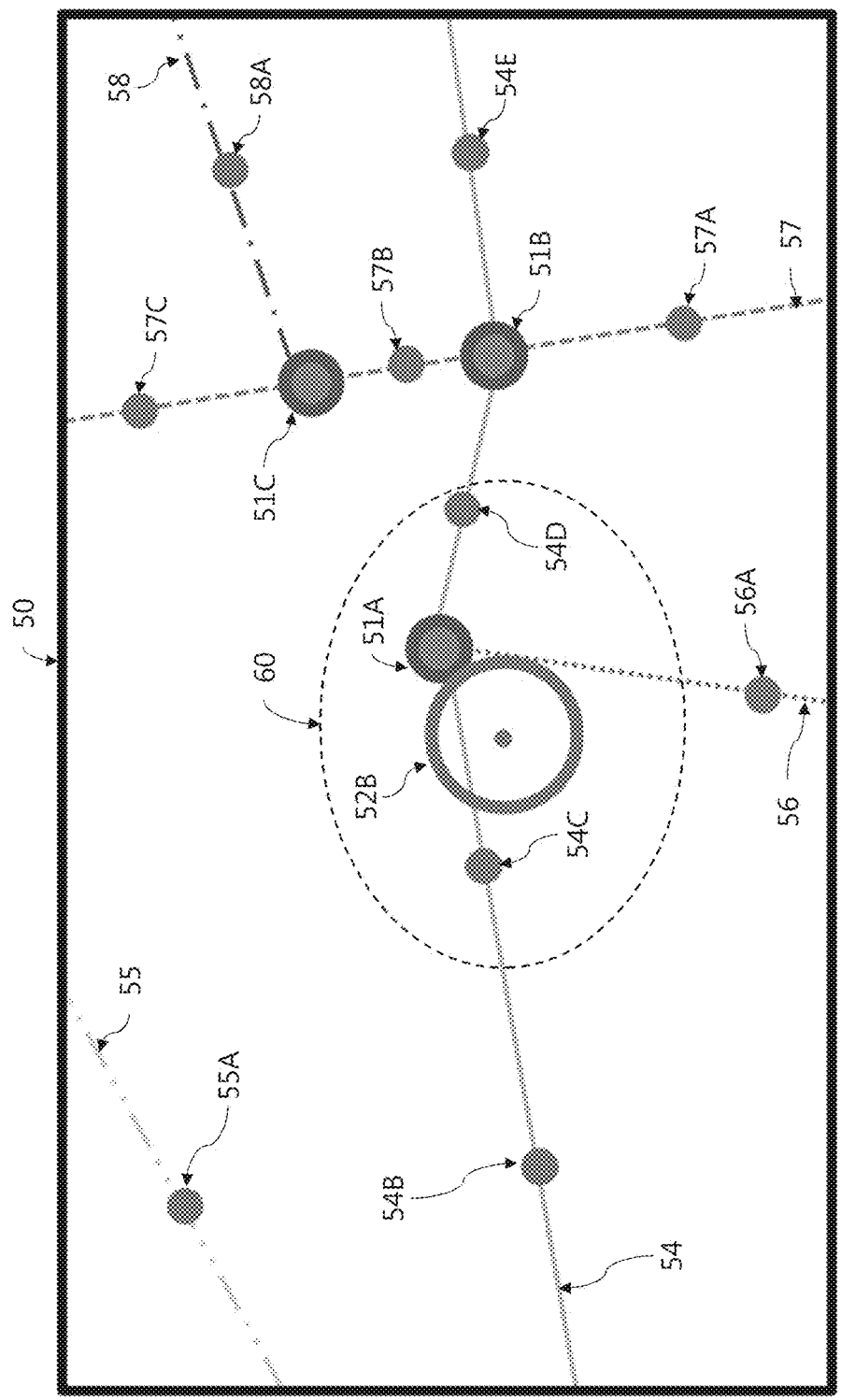

In FIG. 5B, some map information included in the representable region 50 can be reserved. For instance, interpolation points 54C and 54D can be reserved because they are located within a predetermined range 60 from the central location 52B. Reserving some information can prevent displayed information items from overlapping each other, and thus legibility of the GPS navigation device can be enhanced. If the interpolation points 54C and 54D are reserved, respective road names would not be marked at the reserved interpolation points 54C and 54D.

Figure 5C:
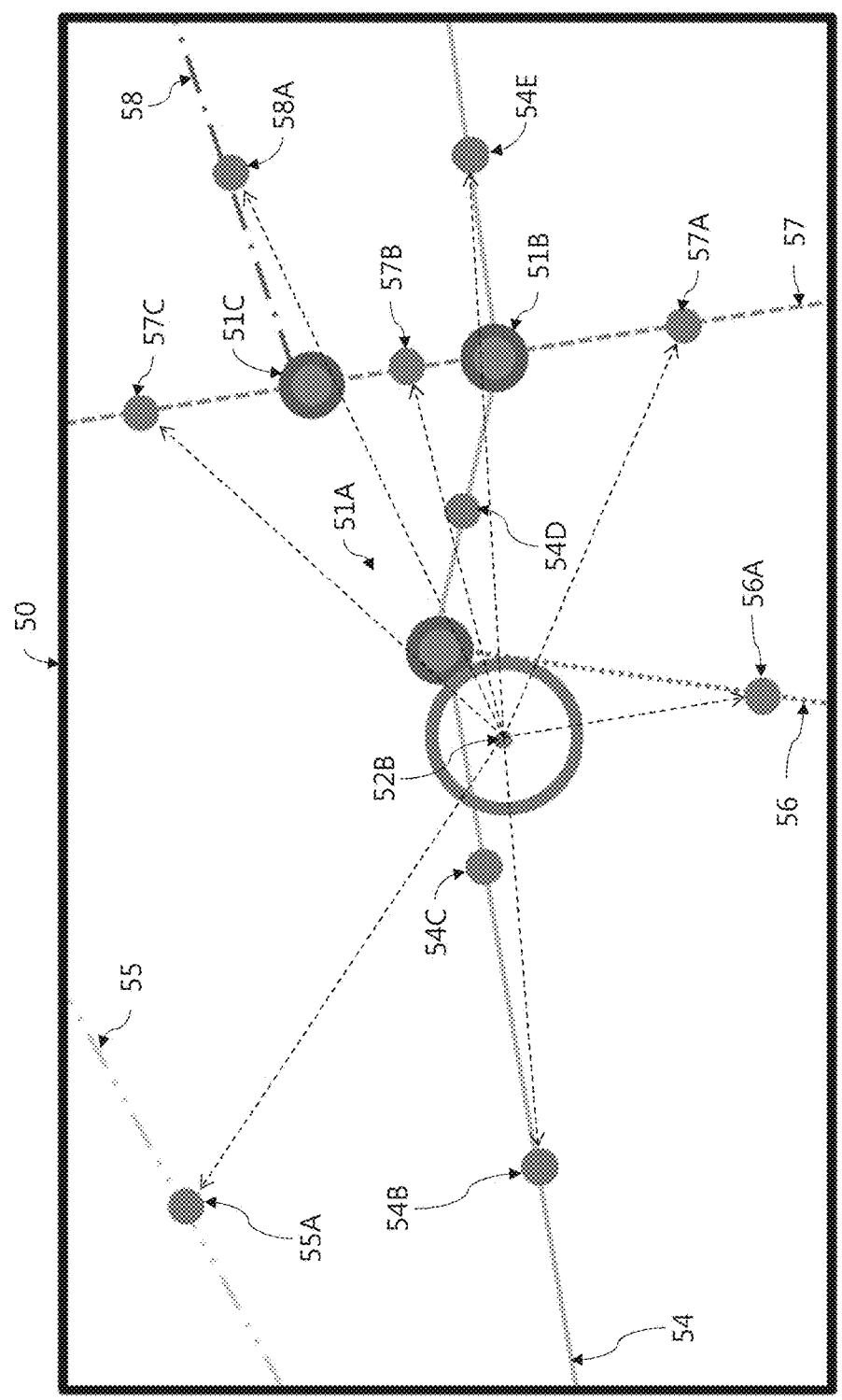

In FIG. 5C, the GPS navigation device can calculate respective distances between the central location 52B and the other interpolation points 54B, 54E, 55A, 56A, 57A, 57B, 57C, 58A, excluding the reserved interpolation points 54C, 54D. Based on the calculation, the GPS navigation device can determine a group of candidate points including the respective interpolation points corresponding to each link 54, 55, 56, 57, 58, which are the closest to the central location 52B. As a non-limiting example, the candidate point marking a road name assigned for the link 54 can be the interpolation point 54B, which is the closest to the central location 52B among the plurality of interpolation points 54B and 54E, excluding the reserved interpolation points 54C and 54D. Likewise, a group of candidate points for the other links can further include: the interpolation point 55A for the link 55, the interpolation point 56A for the link 56, the interpolation point 57A for the link 57, and the interpolation point 58A for the link 58.

In FIG. 5D, the GPS navigation device can check whether each of candidate points 54B, 55A, 56A, 57B, 58A, which are closest non-reserved interpolation points on their respective links to the central location 52B, is within the representable region 50. As a non-limiting example, since the candidate points 54B, 55A, 56A, 57B, 58A shown in FIG. 5D are each included in the representable region 50, the GPS navigation device can show five road names at the candidate points 54B, 55A, 56A, 57B, 58A. Each of the five road names corresponds respectively to each link 54, 55, 56, 57, 58 on which the candidate points 54B, 55A, 56A, 57B, 58A are respectively located.

Figure 5E:
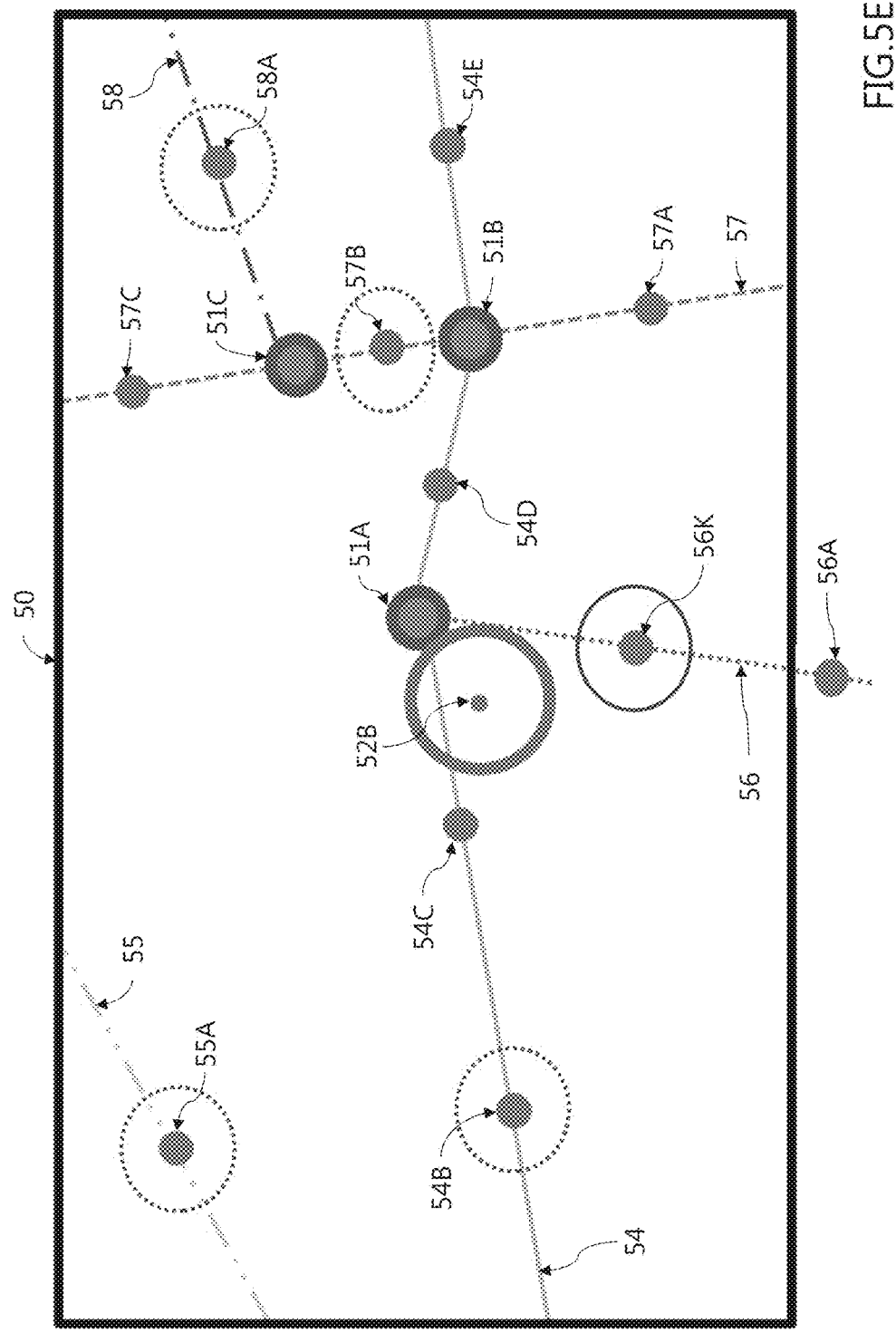

FIG. 5E describes an example in which it is assumed that a particular interpolation point among the five candidate points 54B, 55A, 56A, 57B, 58A shown in FIG. 5D, particularly, interpolation point 56A corresponding to the link 56, is not included in the representable region 50. In this case, because the interpolation point 56A may not be actually shown on a screen of GPS navigation device, the interpolation point 56A is marked as being outside the representable region 50 in explanation. When the particular interpolation point 56A included in the group of candidate points is out of the representable region 50, the GPS navigation device can determine a first middle point 56K to be located in the middle of interpolation point 56A and the node 51A connected to interpolation point 56A. The GPS navigation device can insert the first middle point 56K into the group of candidate points.

Figure 5F:
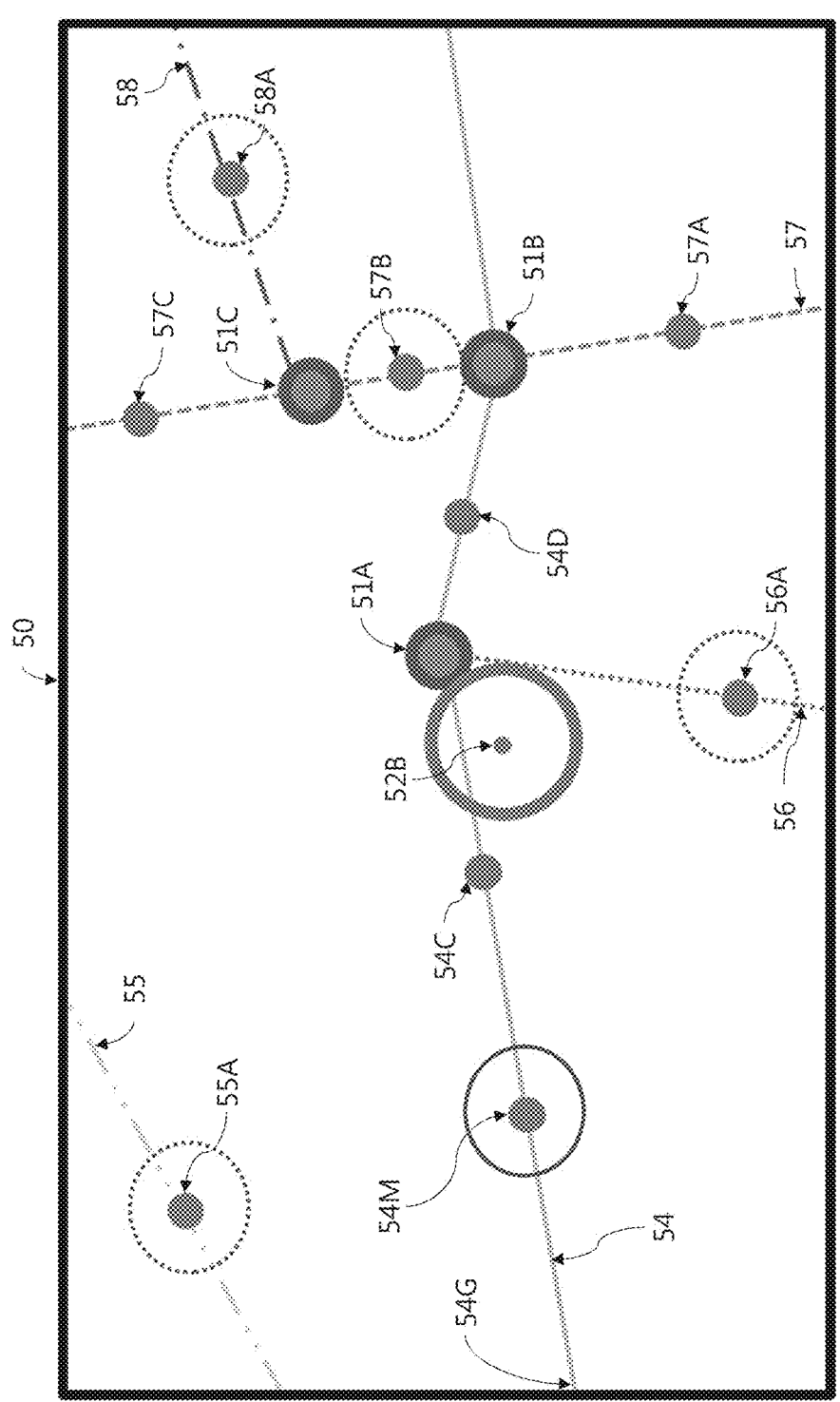

FIG. 5F describes another example in which it is assumed that a particular interpolation point among the five candidate points 54B, 55A, 56A, 57B, 58A shown in FIG. 5D, particularly, interpolation point 54B corresponding to the link 54, is not included in the representable region 50. Further, it is assumed that, other than the reserved interpolation points 54C and 54D included in the predetermined range 60 shown in FIG. 5B, no interpolation point corresponding to the link 54 is included in the representable range 50. In this case, a GPS navigation device might not be able to mark a road name for the link 54 on a screen. To overcome this issue, the GPS navigation device can determine a second middle point 56M between the reserved interpolation point 54C and a virtual point 54G. The virtual point 54G can be determined to be located at an intersection of the link 54 passing through the reserved interpolation points 54C and 54D and a boundary of the representable region 50. The GPS navigation device can add the second middle point 56M into the group of candidate points.

As above described, the GPS navigation device can consider the group of candidate points, each located within the latitudes and longitudes of representable region 50, to be the selected interpolation points. At the selected interpolation points, the GPS navigation device can show or mark road names, each corresponding to a respective link passing through the respective selected interpolation points.

FIG. 6 shows a GPS navigation device.

As shown, the GPS navigation device for providing map information can include a data processing unit 86, an input unit 82, and a display unit 84. The data processing unit 86 can be configured to receive a map (map information) from the storage 88 and process information included in the map. The data processing unit 86 can be configured to perform a series of action or steps taken in order to show the map information including road names to a user. The input unit 82 can be configured to deliver a received input into the data processing unit 86. The display unit 84 (e.g., a screen) can be configured to show processed information outputted from the data processing unit 86.

The data processing unit 86 can be configured to perform steps of determining a range that is, based upon a current specific location on the map, currently representable on the screen, and showing a road included in the range that is currently representable on the screen, with a road name. If at least one of the specific location and the range are changed, the data processing unit 86 can be configured to again perform the steps of determining the range and showing the roads. A respective location for each road name on the map is changeable in response to the range. Further, the data processing unit 86 can perform a step of determining whether a scale of the range that is currently representable on the screen is equal to or smaller than a predetermined scale of map at which a road name will be shown.

As a non-limiting example, the map can be included in the storage 88 engaged with the data processing unit 86. The storage 88 can be included in the GPS navigation device, or can be an additional memory device which is read or written by a computing device included in the GPS navigation device. Further, the map can be provided from a network server via a wireless network.

The map can include a plurality of nodes, at least one link connecting at least two of the plurality of nodes, and at least one interpolation point located on the link. Each node can be a kind of symbol representing a junction, while each link can stand for a road having its name.

To show the road with its name on the display unit 84, the data processing unit 86 can further be configured to assign a location on the map at a center of the display unit 84 as the specific location and determine latitudes and longitudes defining a region corresponding to a size of the display unit 84. The data processing unit 86 can be configured to search for an interpolation point included in the region defined by the latitudes and the longitudes so as to determine coordinates of the screen that correspond to a selected interpolation point. The data processing unit 86 can be configured to show the road name at a location corresponding to the coordinates of display unit 84 that correspond to the selected interpolation point.

In order to search for the interpolation point for showing road names via the display unit 84, the data processing unit 86 can be configured to reserve some of the interpolation points located within a predetermined range from the center of the screen, in order to enhance readability. The data processing unit 86 can be configured to consider an interpolation point to be a candidate point when the interpolation point is adjacent to the center of the screen and is not a reserved interpolation point. After determining whether the candidate point is included in the region defined by the latitudes and the longitudes, the data processing unit 86 can be configured to recognize the candidate point as the selected interpolation point only if the candidate point is included in the region.

If the candidate point is not included in the region, the data processing unit 86 can be configured to further perform at least one step of determining a first middle point between a node included in the map and the candidate point, or determining a second middle point between the reserved interpolation point and a virtual point. The virtual point can be an intersection of a link passing through the reserved interpolation point and a boundary of the region. The data processing unit 86 can be configured to consider at least one of the first middle point or the second middle point to be the selected interpolation point.

If there is a plurality of selected interpolation points, the data processing unit 86 can be configured to choose one of the plurality of selected interpolation points that is the closest to the center of the display unit 84.

As above described, while a user searches on a map and recognizes a specific location, a GPS navigation device can provide road names on a screen regardless of location or area selected by the user, so that convenience of users could be enhanced.

Further, marketability of a GPS navigation device could increase because the GPS navigation device dynamically provides information on user's demand, rather than providing fixed data that is included in, or engaged with, a map.

Further, since a GPS navigation device can store a road name matched with a link connecting a plurality of interpolation points, rather than storing each of the plurality of interpolation points, the volume of map data provided in the GPS navigation device can be more effective so that costs caused by increasing map data can be reduced.

The aforementioned forms may be achieved by combination of structural elements and features of the disclosure in a predetermined manner. Each of the structural elements or features should be considered selectively unless specified separately. Each of the structural elements or features may be carried out without being combined with other structural elements or features. Also, some structural elements and/or features may be combined with one another to constitute the forms of the disclosure. The order of operations described in the forms of the disclosure may be changed. Some structural elements or features of one form may be included in another form, or may be replaced with corresponding structural elements or features of another form. Moreover, it will be apparent that some claims referring to specific claims may be combined with other claims referring to claims other than the specific claims to constitute a form of the disclosure or add new claims by means of amendment after the application is filed.

Various forms may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

It will be apparent to those skilled in the art that various modifications and variations can be made in the disclosure without departing from the spirit or scope of the disclosure. Thus, it is intended that the disclosure covers modifications and variations of this disclosure provided they come within the scope of the appended claims and their equivalents.

What is claimed is:

1. A method for providing map information, comprising:
in response to each change of at least one of (i) a specific location on a map or (ii) a range that is, based upon a specific location on the map, representable on the screen:
determining a range that is, based upon a current specific location on the map, currently representable on the screen; and
showing a road included in the range that is currently representable on the screen, with a road name shown at a location corresponding to an interpolation point included in the map,
wherein, when the interpolation point for showing the road name is out of the range, the road name is shown at a location determined based on at least one of a first middle point and a second middle point which are unfixed in the map but determined based on the range on the screen.

2. The method of claim 1, wherein a respective location for each road name on the map is changeable in response to which range is currently representable on the screen.

3. The method of claim 1, further comprising:
determining whether a scale of the range that is currently representable on the screen is equal to or smaller than a predetermined scale of map at which a road name will be shown.

4. The method of claim 1, wherein the map comprises:
a plurality of nodes, each representing a junction; and
at least one link connecting at least two of the plurality of nodes, the at least one link corresponding to the road name,
wherein each link includes at least one interpolation point.

5. The method of claim 1, wherein showing the road with the road name comprises:
assigning a location on the map at a center of the screen as the specific location to determine latitudes and longitudes of the range;
searching for the interpolation point for showing the road name; and
showing the road name at the location corresponding to a selected interpolation point.

6. The method of claim 5, wherein searching for the interpolation point comprises:
reserving, as a reserved interpolation point, an interpolation point that is located within a predetermined region from the center of the screen;
assigning, as a candidate point, an interpolation point that is adjacent to the center of the screen and that is not reserved as a reserved interpolation point;
determining whether the candidate point is included in the range defined by the latitudes and the longitudes; and
when the candidate point is included in the range defined by the latitudes and the longitudes, selecting the candidate point as a selected interpolation point.

7. The method of claim 6, wherein, when the candidate point is not included in the range defined by the latitudes and the longitudes, searching for an interpolation point comprises at least one of:
determining the first middle point between the candidate point and a node included in the map and coupled with the candidate point; or
determining the second middle point between the reserved interpolation point and a virtual point,
wherein the virtual point is an intersection of (i) a link passing through the reserved interpolation point and (ii) a boundary of the range defined by the latitudes and the longitudes.

8. The method of claim 7, wherein searching for the interpolation point further comprises:
selecting at least one of the first middle point or the second middle point to be a selected interpolation point.

9. The method of claim 5, wherein showing the road with the road name further comprises:
when a plurality of selected interpolation points are selected, choosing one of the plurality of selected interpolation points that is closest to the center of the screen.

10. An apparatus for providing map information on a global positioning system (GPS) navigation device, the apparatus comprising a processing system that comprises at least one data processor and at least one computer-readable memory storing a computer program, herein the processing system is configured to cause the apparatus to:
in response to each change of at least one of (i) a specific location on a map or (ii) a range that is, based upon a specific location on the map, representable on the screen:
determine a range that is, based upon a current specific location on the map, currently representable on the screen; and
show a road included in the range that is currently representable on the screen, with a road name shown at a location corresponding to an interpolation point included in the map,
wherein, when the interpolation point for showing the road name is out of the range, the road name is shown at a location determined based on at least one of a first middle point and a second middle point which are unfixed in the map but determined based on the range on the screen.

11. The apparatus of claim 10, wherein the processing system is further configured to determine whether a scale of the range that is currently representable on the screen is equal to or smaller than a predetermined scale of map at which a road name will be shown.

12. An apparatus for providing map information, comprising:
a data processing unit configured to receive a map and process information included in the map; an input unit configured to deliver received input to the data processing unit; and
a display unit configured to show processed information output from the data processing unit,
wherein the data processing unit is configured to:
in response to each change of at least one of (i) a specific location on a map or (ii) a range that is, based upon a specific location on the map, representable on the screen:
determine a range that is, based upon a current specific location on the map, currently representable on the screen; and
show a road included in the range that is currently representable on the screen, with a road name shown at a location corresponding to an interpolation point included in the map,
wherein, when the interpolation point for showing the road name is out of the range, the road name is shown at a location determined based on at least one of a first middle point and a second middle point which are unfixed in the map but determined based on the range on the screen.

13. The apparatus of claim 12, wherein a respective location for each road name on the map is changeable in response to which range is currently representable on the screen.

14. The apparatus of claim 13, wherein the data processing unit is further configured to determine whether a scale of the range that is currently representable on the screen is equal to or smaller than a predetermined scale of map at which a road name will be shown.

15. The apparatus of claim 12, wherein the map comprises:
   a plurality of nodes, each representing a junction; and
   at least one link connecting at least two of the plurality of nodes, the at least one link corresponding to the road name,
   wherein each link includes at least one interpolation point.

16. The apparatus of claim 12, wherein, to show the road with the road name, the data processing unit is further configured to:
   assign a location on the map at a center of the screen as the specific location to determine latitudes and longitudes of the range;
   search for the interpolation point for showing the road name; and
   show the road name at the location corresponding to a selected interpolation point.

17. The apparatus of claim 12, wherein, to search for the interpolation point, the data processing unit is further configured to:
   reserve, as a reserved interpolation point, an interpolation point that is located within a predetermined region from the center of the screen;
   assign, as a candidate point, an interpolation point that is adjacent to the center of the screen and that is not reserved as a reserved interpolation point;
   determine whether the candidate point is included in the range defined by the latitudes and the longitudes; and
   when the candidate point is included in the range defined by the latitudes and the longitudes, select the candidate point as a selected interpolation point.

18. The apparatus of claim 12, wherein, the data processing unit is further configured to, when the candidate point is not included in the range defined by the latitudes and the longitudes, at least one of:
   determine the first middle point between the candidate point and a node included in the map and coupled with the candidate point; or
   determine the second middle point between the reserved interpolation point and a virtual point, wherein the virtual point is an intersection of (i) a link passing through the reserved interpolation point and (ii) a boundary of the range defined by the latitudes and the longitudes.

19. The apparatus of claim 18, wherein the data processing unit is further configured to select at least one of the first middle point or the second middle point to be a selected interpolation point.

20. The apparatus of claim 18, wherein the data processing unit is further configured to, when a plurality of selected interpolation points are selected, choose one of the plurality of selected interpolation points that is closest to the center of the screen.

* * * * *